United States Patent

[11] 3,601,459

| [72] | Inventor | Edward John Cutting<br>4 Barton Close, Shepperton, Middlesex, England |
|------|----------|-------|
| [21] | Appl. No. | 834,699 |
| [22] | Filed | June 19, 1969 |
| [45] | Patented | Aug. 24, 1971 |
| [32] | Priority | Aug. 23, 1968 |
| [33] | | Great Britain |
| [31] | | 40313/68 |

[54] SPRING LOADED BEARING
6 Claims, 2 Drawing Figs.

[52] U.S. Cl. .................................................. 308/238, 308/26
[51] Int. Cl. ....................................................... F16c 27/00, F16c 27/00
[50] Field of Search ............................................. 308/238, 26, 63, 65

[56] References Cited
UNITED STATES PATENTS

| 3,318,642 | 5/1967 | Peterson ...................... | 308/26 |
| 3,348,887 | 10/1967 | Sheps ........................... | 308/26 |
| 3,400,937 | 9/1968 | Crankshaw .................. | 308/26 |

Primary Examiner—William F. O'Dea
Assistant Examiner—Wesley S. Ratliff, Jr.
Attorneys—John R. Faulkner and Clifford L. Sadler ABSTRACT: A plastic bearing constructed to support a shaft. The bearing has an irregular inner surface with spaced bearing points engaging the shaft. A spring is embedded in the plastic body of the bearing which exerts a force keeping the bearing surface in engagement with the shaft as the bearing wears.

PATENTED AUG 24 1971 3,601,459

INVENTOR
*EDWARD JOHN CUTTING*
BY *Clifford L. Sadler*
*John R. Faulkner*
ATTORNEYS

# 3,601,459

SPRING LOADED BEARING

BRIEF SUMMARY OF THE DISCLOSURE

This invention relates to bearings. According to the invention, a bearing for supporting a rod for sliding or rotary movement within a cylindrical housing comprises a sleeve of molded plastics material, and a corrugated spring ring molded into the sleeve and disposed in a radial plane of the sleeve. The arrangement is such that, when the sleeve is in position between the rod and the cylindrical housing, the inward corrugations of the spring ring bias spaced portions of the inner surface of the sleeve into contact with the rod, whereby bearing contact of the sleeve with the rod and cylindrical housing is maintained during wear of the sleeve. Radial movement of the rod, relative to the cylindrical housing, is cushioned by the resilience of the corrugated spring ring.

The sleeve may be formed with axial grooves to permit free flow of air or hydraulic fluid from one side of the bearing to the other in the space between the rod and the cylinder. The bearing finds application, for example, in a rack and pinion steering gear.

BRIEF DESCRIPTION OF THE DRAWINGS

The invention will now be described with reference to the accompanying drawings in which.

DETAILED DESCRIPTION OF AN EMBODIMENT OF THE INVENTION

Figure 1:
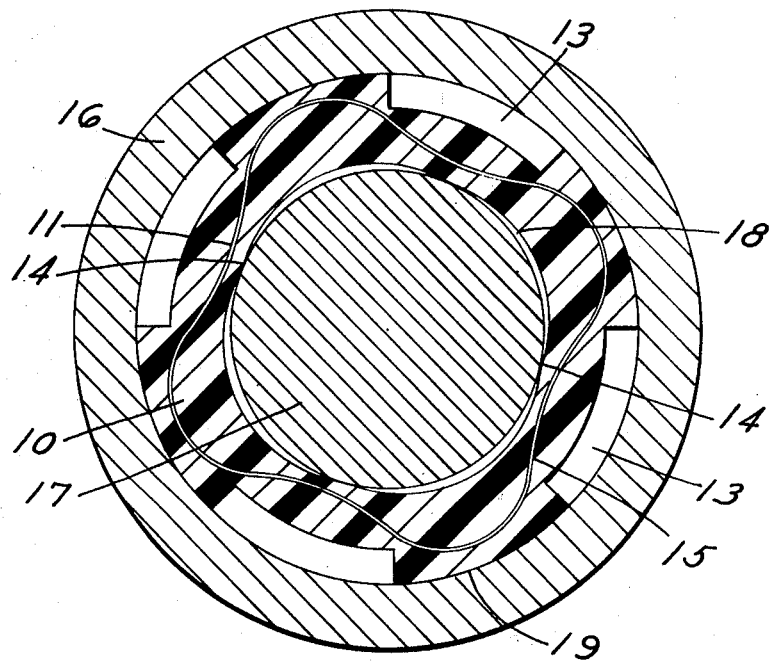
FIG. 1 is a cross-sectional view of a bearing embodying the invention and shows the manner in which the bearing supports a rod for sliding movement within a cylinder.
Figure 2:
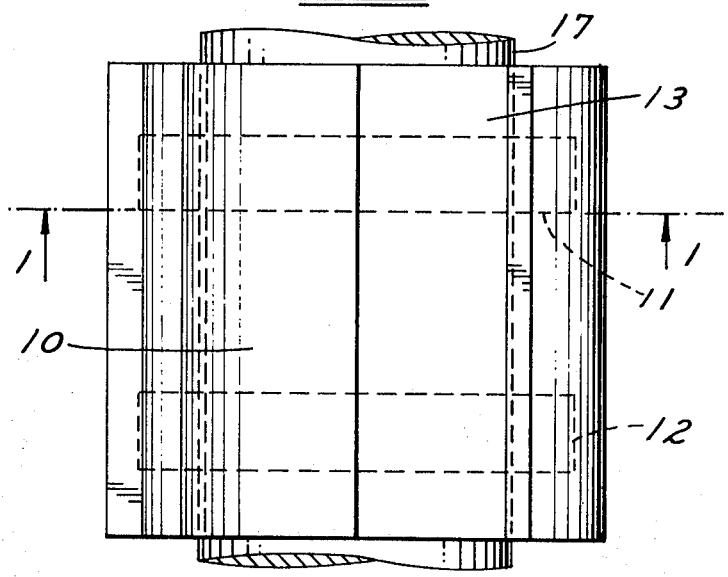
FIG. 2 is a side elevation of the bearing of FIG. 2.

The bearing comprises a molded plastic sleeve 10 within which are embedded two spring rings 11 and 12. The spring rings are formed of flat leaf spring material.

The outer surface of the sleeve 10 is formed with axial grooves 13 which extend the full length of the sleeve. The inner surface of the sleeve is formed with axially extending corrugations which provide a number of peripherally spaced bearing portions 14. The pitch of the corrugations and their disposition is such that each bearing portion 14 is situated inwardly of a corresponding groove 13.

The spring rings 11 and 12 are each corrugated. Each inward corrugation 15 is situated between a corresponding groove 13 and bearing portion 14.

The bearing is formed from a wear resistance plastic material such as nylon and may be impregnated with a lubricant. The bearing is formed by conventional molding techniques with the spring rings located in the mold.

The dimensions of the bearing are such that it is a tight fit within the cylindrical housing 16 and such that the inner diameter of the sleeve, across the bearing portions 14, is somewhat less than the diameter of the rod 17 which is required to be supported for sliding or rotary movement in the housing 16. The inner diameter of the sleeve 10 across the outward corrugations 18 of the inner surface is just sufficient to permit insertion of the rod 17 after the bearing portions 14 have been deformed outwardly.

OPERATION

When the rod is inserted into the bearing, the spring rings and the material of the sleeve are stressed and forces are exerted within the bearing which spring bias the bearing surfaces 14 into contact with the rod. When wear takes place in the bearing surfaces 14 they are maintained firmly in contact with the rod by the resilience of the spring rings and the material of the sleeve.

The bearing described above is suitable for an application in which the bearing is located relative to the cylindrical housing and relative movement takes place only between the rod and the inner surface of the sleeve. For an application in which relative movement takes place between the bearing and the cylindrical housing 16, the outer diameter of the sleeve is made greater than the inner diameter of the housing 16 so that when the bearing is in position the outer bearing surfaces 19 are biased into contact with the inner wall of the housing by the spring rings 11 and 12. The grooves may alternatively be formed on the inner periphery of the sleeve.

The bearing is particularly suitable for locating the rack of a rack and pinion steering gear relative to the housing of the rack. Conventional bearings in rack and pinion steering gears have a tendency to permit rattling of the rack after relatively little wear has taken place. Lateral movement of the rack is cushioned by the bearing of the invention and the tendency to rattle is considerably reduced.

When used in a rack and pinion steering gear as described above the grooves in the bearing permit air or, in the case of a power assisted gear of the kind in which a hydraulic piston and cylinder arrangement is formed by the rack and housing, hydraulic fluid to flow freely from one side of the bearing to the other as steering movements are affected.

The foregoing description presents the presently brief embodiment of this invention. Modifications and alterations may occur to those skilled in the art that will come within its scope and spirit.

I claim:

1. A bearing having a generally annular configuration with an irregular bearing surface having spaced apart bearing portions, said bearing portions being constructed to slidably engage an annular surface of a supported member, a supporting member spaced from said bearing portions and engaging said bearing, said bearing being molded of plastic material and having a metal annular leaf spring integrally molded therein, said spring exerting a force tending to urge said bearing portions into engagement with said supported member.

2. A bearing assembly comprising a sleeve of molded plastic material and concentrically arranged supported and supporting members, said sleeve being interposed between said members, said sleeve being in supporting engagement with said supporting member, said sleeve having an undulating annular surface with spaced bearing portions in sliding engagement with said supported member, an annular spring ring formed of metallic leaf spring material and integrally molded into said bearing sleeve, said spring ring exerting a force urging said bearing portions into engagement with said supported member.

3. A bearing assembly according to claim 2 and including: said spring ring having a radially undulating contour.

4. A bearing assembly according to claim 2 and including: said spring ring having an undulating contour with inwardly extending lobes positioned adjacent said bearing portions.

5. A bearing assembly according to claim 2 and including: said sleeve having spaced apart support portions engaging said supporting member, said spring ring having an undulating contour with outwardly extending lobes positioned adjacent said support portions and inwardly extending lobes positioned adjacent said bearing portions.

6. A bearing assembly comprising a cylindrical housing, a plastic sleeve disposed within said housing and a supported member disposed within said sleeve, said sleeve having circumferentially spaced support portions engaging said housing, said sleeve having circumferentially spaced bearing portions engaging said support member, said sleeve being molded of plastic material and having a metallic leaf spring ring integrally molded therein, said spring ring having an undulating contour with outwardly extending lobes positioned adjacent said support portions and inwardly extending lobes positioned adjacent said bearing portions.